(12) United States Patent  (10) Patent No.: US 9,103,693 B2
Jiang et al.  (45) Date of Patent: Aug. 11, 2015

(54) MAP DISPLAY DEVICE

(75) Inventors: Tianfeng Jiang, Yokohama (JP); Xiaoxue Liang, Kawasaki (JP)

(73) Assignee: Clarion Co., Ltd., Tokyo (JP)

( * ) Notice: Subject to any disclaimer, the term of this patent is extended or adjusted under 35 U.S.C. 154(b) by 865 days.

(21) Appl. No.: 12/936,653

(22) PCT Filed: Apr. 7, 2008

(86) PCT No.: PCT/JP2008/056862
§ 371 (c)(1),
(2), (4) Date: Jun. 17, 2011

(87) PCT Pub. No.: WO2009/125463
PCT Pub. Date: Oct. 15, 2009

(65) Prior Publication Data
US 2011/0292030 A1 Dec. 1, 2011

(51) Int. Cl.
G09B 29/00 (2006.01)
G01C 21/36 (2006.01)
G01W 1/04 (2006.01)

(52) U.S. Cl.
CPC ............. *G01C 21/3694* (2013.01); *G01W 1/04* (2013.01); *G09B 29/007* (2013.01)

(58) Field of Classification Search
CPC .............................. G09B 29/007; G06T 11/40
See application file for complete search history.

(56) References Cited

U.S. PATENT DOCUMENTS

| 6,297,766 B1 * | 10/2001 | Koeller .................... 342/357.31 |
| 7,158,878 B2 * | 1/2007 | Rasmussen et al. .......... 701/431 |
| 7,847,708 B1 * | 12/2010 | Jones et al. ................... 340/905 |
| 2011/0292030 A1 | 12/2011 | Jiang et al. |

FOREIGN PATENT DOCUMENTS

| JP | 2000-258174 A | 9/2000 |
| JP | 2003-98956 A | 4/2003 |
| JP | 2003-121172 A | 4/2003 |
| JP | 2004-69561 A | 3/2004 |
| JP | 2006-292656 A | 10/2006 |
| JP | 2007-132680 A | 5/2007 |

(Continued)

OTHER PUBLICATIONS

English Translation JP-2004-069561.*
English Translation JP-2003-098956.*

(Continued)

*Primary Examiner* — Kee M Tung
*Assistant Examiner* — Ryan M Gray
(74) *Attorney, Agent, or Firm* — Crowell & Moring LLP

(57) ABSTRACT

A map display device 11 according to the present invention includes: a display monitor 16 at which a display screen displaying a map is divided into a plurality of split areas and a set of weather information is displayed over each of the split areas; a satellite radio reception unit 111 that individually receives sets of weather information for a plurality of regions; and a control circuit 11 unit that extracts sets of weather information for regions containing an area of map displayed at the display monitor among the sets of the received weather information and allocates each of the sets of the extracted weather information for the regions to each of the split areas on the display screen, and that displays the map at the display monitor and also displays the sets of the extracted weather information for the regions by allocating each of the sets of the extracted weather information for the regions to each of the split areas on the display screen.

5 Claims, 9 Drawing Sheets

(56) References Cited

FOREIGN PATENT DOCUMENTS

| | | |
|---|---|---|
| JP | 2007-292566 A | 11/2007 |
| WO | WO 2009/125463 A1 | 10/2009 |

OTHER PUBLICATIONS

English Translation JP-2004-069561 Mar. 4, 2004.*
English Translation JP-2003-098956 Apr. 4, 2003.*
International Search Report dated Jul. 8, 2008 (Two (2) pp.).

* cited by examiner (a)

(b)

(a)

(b)

(a)

(b)

(c)

(a)

(b)

MAP DISPLAY DEVICE

TECHNICAL FIELD

The present invention relates to a map display device that superimposes weather information over a map on display.

BACKGROUND ART

At a navigation system known in the related art, wind direction information or wind velocity information for an area around the subject vehicle position may be provided as a wind direction mark superimposed over a map on display (see patent reference 1).
Patent reference 1: Japanese Laid Open Patent Publication No. 2006-292656

DISCLOSURE OF THE INVENTION

Problems to be Solved by the Invention

Weather information to be provided over a map on display at a map display device in the navigation system such as that disclosed in patent reference 1 must be brought up on display promptly.

Means for Solving the Problems

A map display device according to the present invention comprises: a display monitor at which a display screen displaying a map is divided into a plurality of split areas and a set of weather information is displayed over each of the split areas; a reception unit that individually receives sets of weather information for a plurality of regions; an information extraction unit that extracts sets of weather information for regions containing an area of map displayed at the display monitor among the sets of the received weather information and allocates each of the sets of the extracted weather information for the regions to each of the split areas on the display screen; and a display control unit that displays the map at the display monitor and also displays the sets of the extracted weather information for the regions by allocating each of the sets of the extracted weather information for the regions to each of the split areas on the display screen. It is preferred that the information extraction unit includes: a geographical position calculation unit that calculates geographical positions that respectively correspond to centers of the split areas on the displayed map; and an extraction unit that extracts the sets of the weather information for the regions containing the calculated geographical positions, among the sets of the received weather information. The set of the weather information includes a set of information for each of a plurality of split regions defined by dividing a weather information-available geographical range into a plurality of regions; and the extraction unit extracts sets of weather information for split regions that contain geographical positions corresponding to the split areas on the display screen, among the plurality of split regions. It is preferred that if the geographical position is on a partitioning line of the split regions, a set of weather information included in one of a plurality of the split regions partitioned by the partitioning lines is allocated as a set of weather information corresponding to the geographical position.
The map display device according to the present invention, wherein: the display screen is divided into m×n (m and n each represents an odd number) split areas that are set in a two-dimensional array; and the map display device further comprises a scroll unit that scrolls the map in response to a depression of the display screen at the display monitor so as to set a geographical position on the map corresponding to a depressed position to a center of the display screen. It is preferred that once the scroll unit has finished scrolling the map, the geographical position calculation unit calculates the geographical positions corresponding to centers of the split areas on the map currently on display and the extraction unit extracts the sets of weather information for the regions containing the calculated geographical positions among the sets of the received weather information. The weather information indicates wind direction, wind strength, temperature, humidity, precipitation par unit time, long-term precipitation, duration of sunshine par unit time, barometric pressure or humidity.
Sets of the weather information of the map display device according to the present invention are transmitted in correspondence to a plurality of tiles defined by dividing the weather information-available geographical range into greater regions and each tile holds the sets of weather information in correspondence to each of a plurality of mesh areas defined by dividing the region represented by the title into smaller areas. It is preferred that the extraction unit extracts, as the weather information for one of the plurality of the split areas on the display screen, one of the sets of weather information for the mesh areas containing the geographical positions as a set of representative weather information.
It is preferred that a navigation system is equipped with a map display device according to the present invention.

Effect of the Invention

According to the present invention, the processing for superimposing weather information over a map on display can be expedited.

BEST MODE FOR CARRYING OUT THE INVENTION

Figure 1:
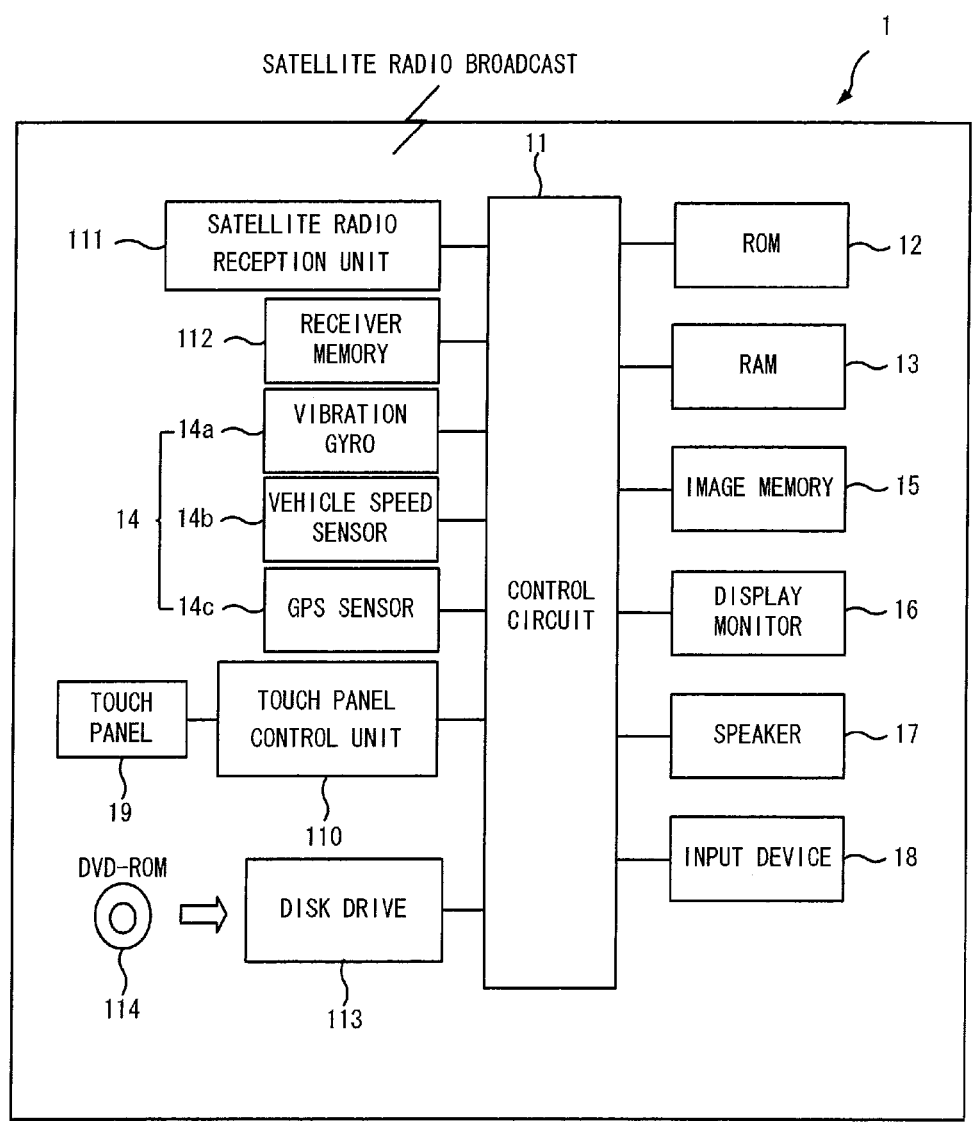
FIG. 1 A block diagram showing the structure of the navigation system achieved in an embodiment of the present invention.

FIG. 1 shows a navigation system 1 achieved in an embodiment of the present invention. The navigation system 1 is capable of displaying weather information received through a satellite radio broadcast by superimposing the weather information over a map on display at a display monitor 16. Satellite radio broadcasters in the known art include, for instance, Sirius Satellite Radio. The navigation system 1 comprises a control circuit 11, a ROM 12, a RAM 13, a current position detection device 14, an image memory 15, the display monitor 16, a speaker 17, an input device 18, a touch panel 19, a touch panel control unit 110, a satellite radio reception unit 111, a receiver memory 112 and a disk drive 113. A DVD-ROM 114 with map data stored therein is loaded into the disk drive 113.

The control circuit 11, constituted with a microprocessor and its peripheral circuits, executes various types of control as it executes a control program stored in the ROM 12 by using the RAM 13 as a work area. The results of a specific type of route search processing executed by the control circuit 11 based upon the map data stored in the DVD-ROM 114, are brought up on display as a recommended route at the display monitor 16.

The current position detection device 14 detects the current location of the vehicle. The current position detection device 14 is constituted with a vibration gyro 14a, a vehicle speed sensor 14b, a GPS (global positioning system) sensor 14c and the like. The vibration gyro 14a detects the direction along which the vehicle is advancing. The vehicle speed sensor 14b detects the vehicle speed. The GPS sensor 14c detects GPS signals transmitted from GPS satellites. Based upon the current location of the vehicle detected by the current position detection device 14, the navigation system 1 determines an optimal map display range, a route search start point and the like. In addition, it indicates the current vehicle position with a subject vehicle position mark on the map.

In the image memory 15, image data to be displayed at the display monitor 16 are stored. Such image data include road-map drawing data and various types of graphics data. These image data are generated by the control circuit 11 as needed based upon the map data stored in the DVD-ROM 114 and the like. The navigation system 1 is able to provide a map display and the like by using the image data thus generated.

The disk drive 113 reads out map data from the DVD-ROM 114. The map data include map display data and route search data. The map display data and the route search data include link information and node information related to the roads in the map data. The map display data include map data at seven different scaling factors from wide range through detailed. The scaling factor of the map on display can be thus adjusted to one of the seven different levels in response to a user request. It is to be noted that map data may be read out via a recording medium other than the DVD ROM 114, such as a CD-ROM or a hard disk.

Various types of information including a map of an area around the subject vehicle position are provided, based upon various types of information such as map data, to the user as a screen display brought up at the display monitor 16. Through the speaker 17, voice messages prompting the user to perform various types of input operations or providing route guidance to the user are output. The input device 18, which includes operation keys operated by the user to select various command settings and the like, is constituted with button switches on a operation panel, hardware switches disposed around the panel and the like. In addition, the user operates the input device 18 to alter the scaling factor of the map on display at the display monitor 16. For instance, a scaling factor of the 1/50,000 map is "1/50000". The user also sets a destination by manually operating the input device 18 in response to instructions provided on the display screen at the display monitor 16 or voice instructions output through the speaker 17. Furthermore, the user operates the input device 18 to select a specific satellite radio broadcast station.

Once a destination has been selected by the user, the navigation system 1 executes route calculation to determine a route to the destination based upon a specific algorithm by designating the current location detected via the current position detection device 14 as a start point. The route (hereafter referred to as a recommended route) thus determined is indicated on the screen display in a display mode distinguishable from other roads by, for instance, using a different display color. The user is thus able to identify the recommended route on the map on the screen display. In addition, the navigation system 1 guides the vehicle along the route by indicating to the user a specific direction along which the vehicle should advance with instructions provided on the screen or with voice instructions, so that the vehicle travels along the recommended route.

The touch panel 19 is a transparent touch switch laminated over the surface of the display monitor 15. An image brought up on display at the display monitor 16 is thus viewed through the touch panel 19. This also means that as the user touches the screen display brought up at the display monitor 16, the touch panel 19 is depressed. The touch panel 19 outputs a signal corresponding to an operating position at which the touch panel 19 is depressed, to the touch panel control unit 110. The touch panel control unit 110 then calculates the depression position at which the touch panel 19 has been depressed.

As the user presses down on a specific button among various buttons, a display menu or the like on display at the display monitor 16 with his finger or the like, the touch panel 19, too, is depressed. In response, the processing defined in correspondence to the particular button or display menu is executed. In addition, as a specific point within a map on display at the display monitor 16 is touched, the touch panel 19 is also depressed at the corresponding position and the map is scrolled so as to set the depressed position at the center of the screen display at the display monitor 16.

The satellite radio reception unit 111 receives a satellite radio broadcast provided from a satellite radio station (not shown) via an artificial satellite and outputs the received satellite radio broadcast to the control circuit 11. The satellite radio broadcast having been received is output through the speaker 17. In addition, weather information provided in the satellite radio broadcast having been received at the satellite radio reception unit 111 is stored into the receiver memory 112.

The weather information provided in the satellite radio broadcast includes weather map information, extreme weather information on typhoons, hurricanes and the like, precipitation distribution information collected via weather radar, information on wind direction and wind strength observed at various observation points and the like. The weather map information may include, for instance, information indicating the position (latitude/longitude) of a high-pressure system or a low pressure system, information indicating the position of a warm front or a cold front, isobaric chart information and barometric pressure information. The extreme weather information will include information indicating the positions of a typhoon, a hurricane, a tornado, an ice storm, a hail storm, a thunder storm and the like, information indicating the directions along which the extreme weather is moving and information predicting how the extreme weather is likely to advance. The precipitation distribution information indicates the position of an area experiencing rainfall, the rate of precipitation at the particular position and the like.

Figure 2:
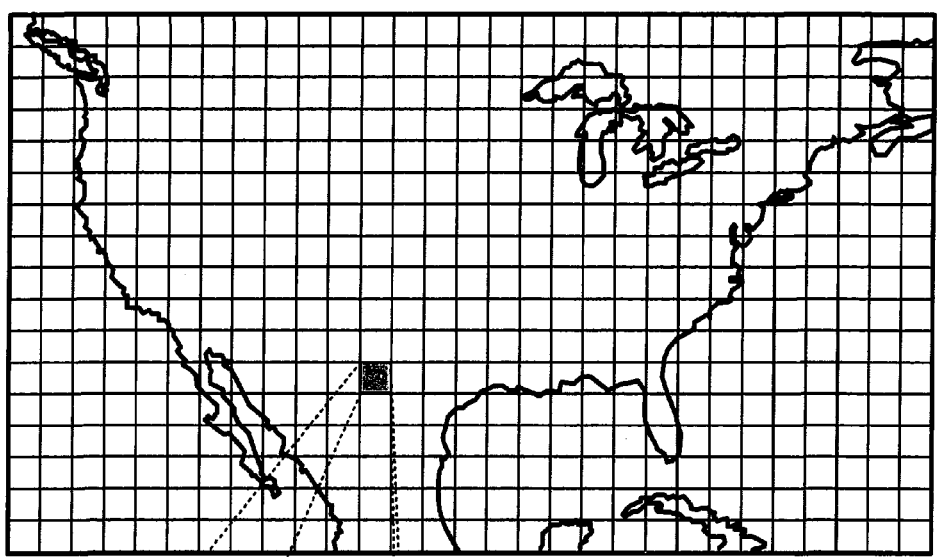
FIG. 2 An illustration provided to facilitate an explanation of weather information transmitted through a satellite radio broadcast FIG. 3 An illustration of a map with wind data superimposed thereupon FIG. 4 An illustration provided to facilitate an explanation of fixed positions and the latitudes/longitudes of positions on the map corresponding to the fixed positions FIG. 5 A flowchart of the wind data display processing executed in the embodiment of the present invention FIG. 6 An illustration demonstrating how pixels containing the positions on the map corresponding to the fixed positions can be determined FIG. 7 The relationship between the map scale and the pixel density FIG. 8 Illustrations each demonstrating how a pixel containing a position on the map corresponding to a fixed position can be determined when the position on the map corresponding to the fixed position is present on a pixel boundary FIG. 9 An illustration of a wind data display operation through which the wind data for any desired position can be brought up on display.
Figure 2:
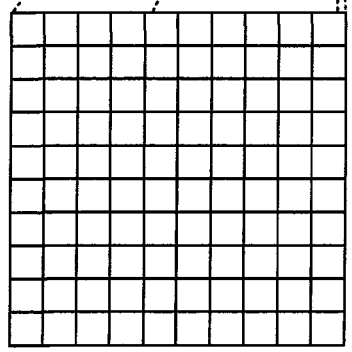

Weather information is provided through the satellite radio broadcast in correspondence to each of specific geographical regions. For instance, the United States of America is divided into separate regions as illustrated in FIG. 2(a) and the satellite radio broadcast provides weather information collected in correspondence to the individual regions. In the following description, a given region is referred to as a tile. As shown in FIG. 2(b), a tile 20 is further divided into smaller areas in a mesh pattern, and the weather information corresponding to the tile 20 is divided in correspondence to the individual mesh areas. In the description, the mesh areas defined by dividing each tile are referred to as pixels. Weather information corresponding to a plurality of tiles is serially transmitted through the satellite radio broadcast instead of transmitting the weather information for all the tiles at once.

The receiver memory 112 is constituted with a rewritable non-volatile recording medium such as a flash memory or a hard disk. The weather information received via the satellite radio reception unit 111 is stored into the receiver memory 112. The weather information stored in the receiver memory 112 is displayed on a map in the form of icons, isobars, cold fronts or the like.

Figure 3:
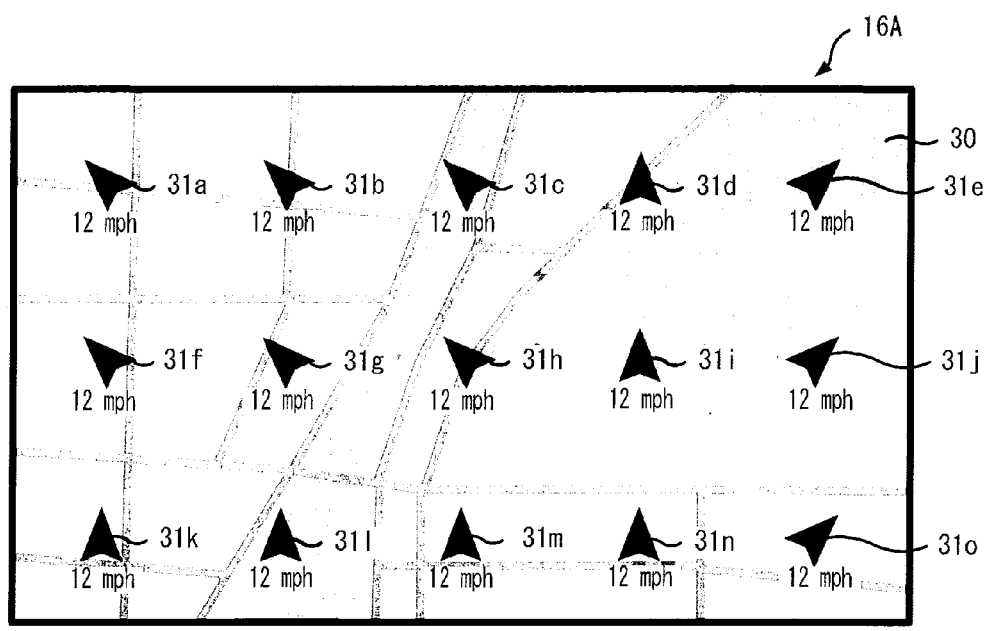
Figure 4:
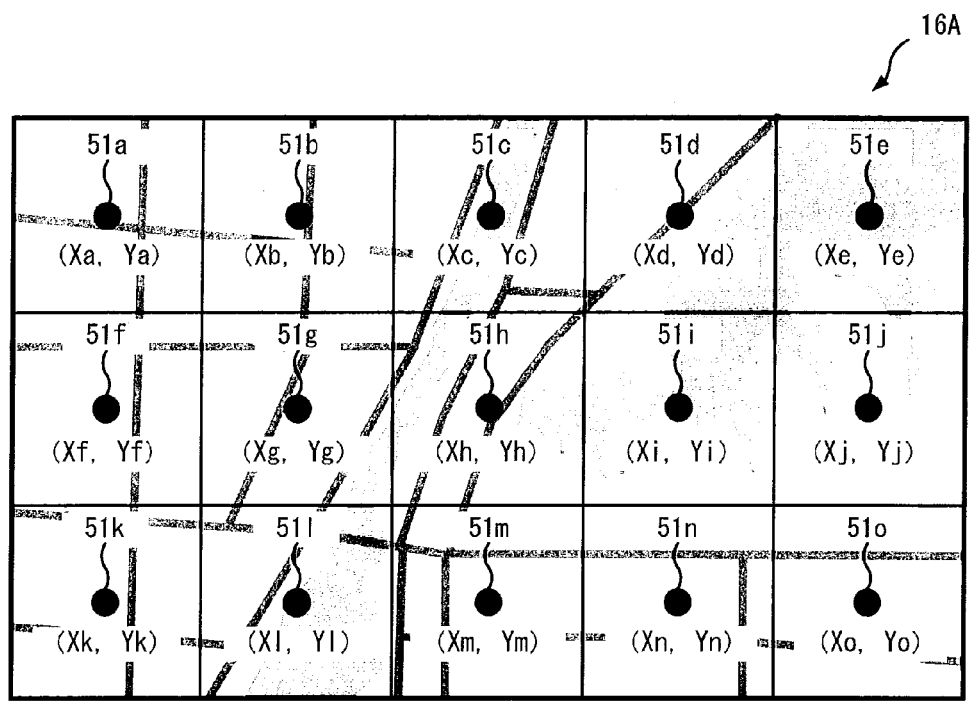

Next, in reference to FIG. 3, the wind data display processing executed in the embodiment of the present invention is described. FIG. 3 shows a display screen 16A brought up at the display monitor 16 to provide a map 30 over which wind data are displayed. Icons 31a through 31o indicating wind direction are superimposed over the map 30 on display, with corresponding wind velocity indicated under the icons 31a through 31o. In the embodiment, the icons 31a through 31o are displayed at centers 51a through 51o of 3×5 (15) split screen areas formed by splitting the display screen into three equal portions longitudinally and into five equal portions laterally, as illustrated in FIG. 4. In the following description, the center of each split screen area is to be referred to as a fixed position.

The positions set as the fixed positions and the quantity of the fixed positions remain unchanged regardless of the scaling factor of the map brought up on display at the display monitor 16. In other words, the quantity of fixed positions does not increase even if the scaling factor of the map on display at the display monitor 16 is reduced, and the quantity of fixed positions does not decrease even if the scaling factor of the map on display at the display monitor 16 is raised. Coordinates (Xa, Ya) through (Xo, Yo) in FIG. 4 indicate latitudes/longitudes on the map in correspondence to the fixed positions 51a through 51o.

Figure 5:
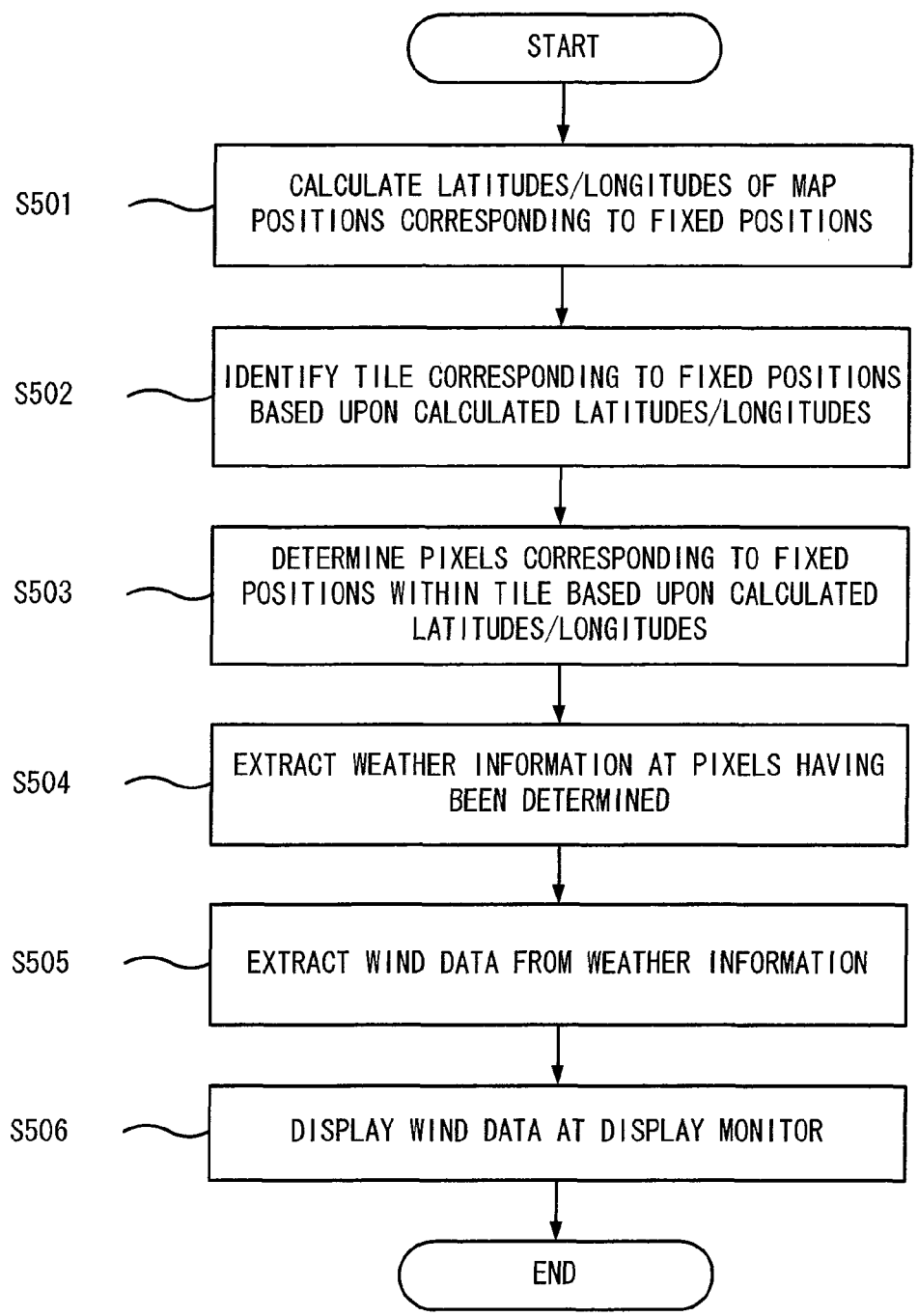

Next, in reference to the flowchart presented in FIG. 5, the wind data display processing executed in the embodiment of the present invention is described. The processing in FIG. 5 is executed by the control circuit 11 based upon a program started up as "display wind data" is selected from a menu (not shown).

Figure 6:
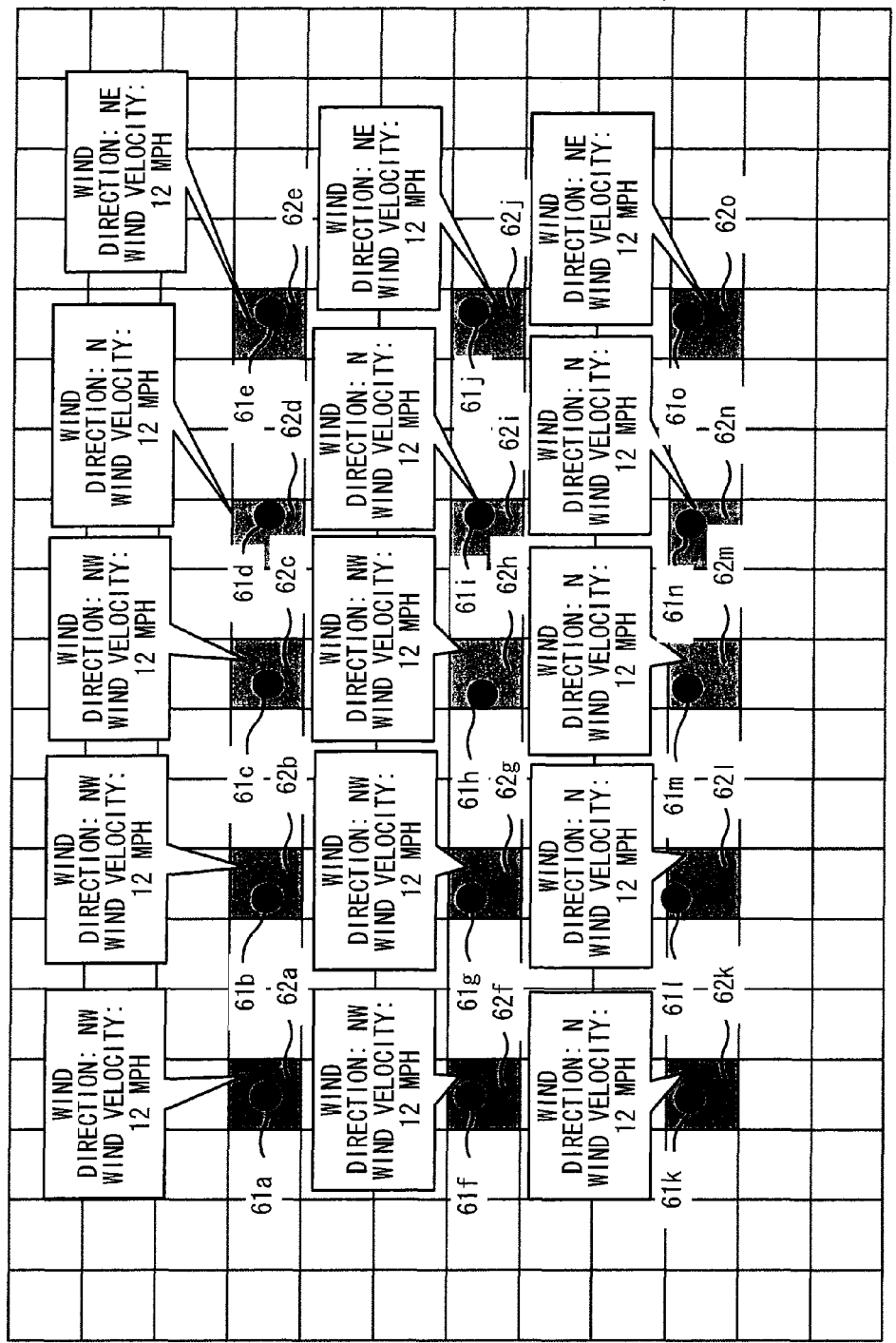

In step S501, the latitudes/longitudes of positions 61a through 61o (see FIG. 6) on the map, which respectively correspond to the fixed positions 51a through 51o assumed at the centers of the 15 split screen areas at the display monitor 16, are calculated. In step S502, the tile containing the map positions (the latitudinal/longitudinal positions) corresponding to the fixed positions is identified based upon the calculated latitudes/longitudes. In step S503, pixels 62a through 62o containing the calculated latitudinal/longitudinal positions are determined among a plurality of pixels in the identified title, as shown in FIG. 6. It is to be noted that the explanation is given in reference to FIG. 3A through FIG. 6 by assuming that the fixed positions 51a through 51o are all present within a single title. In addition, wind data indicating wind direction and wind velocity are stored in the receiver memory 112 in correspondence to the individual pixels.

Figure 7:
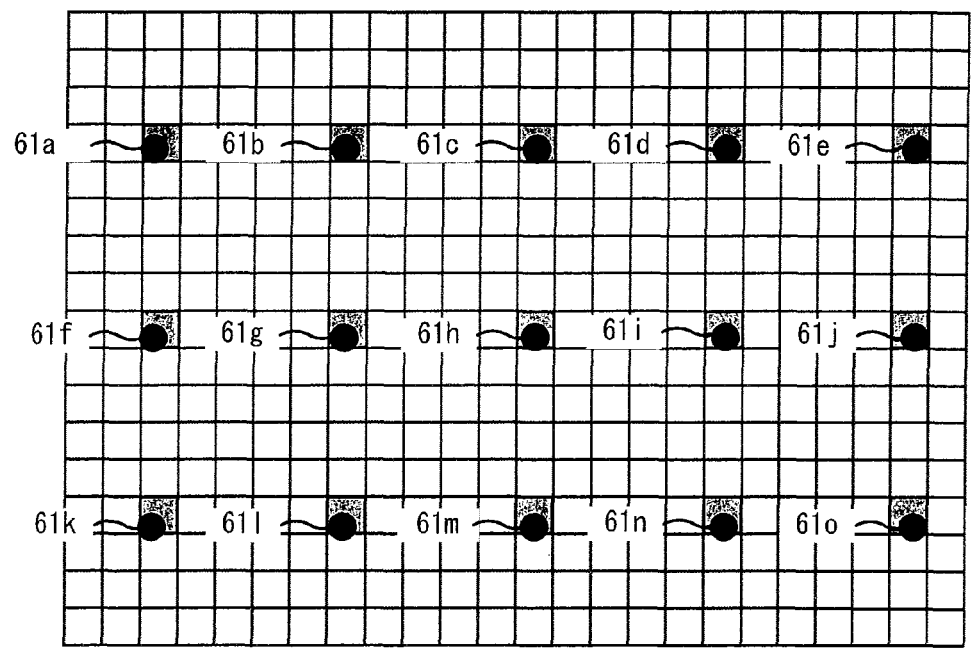
Figure 7:
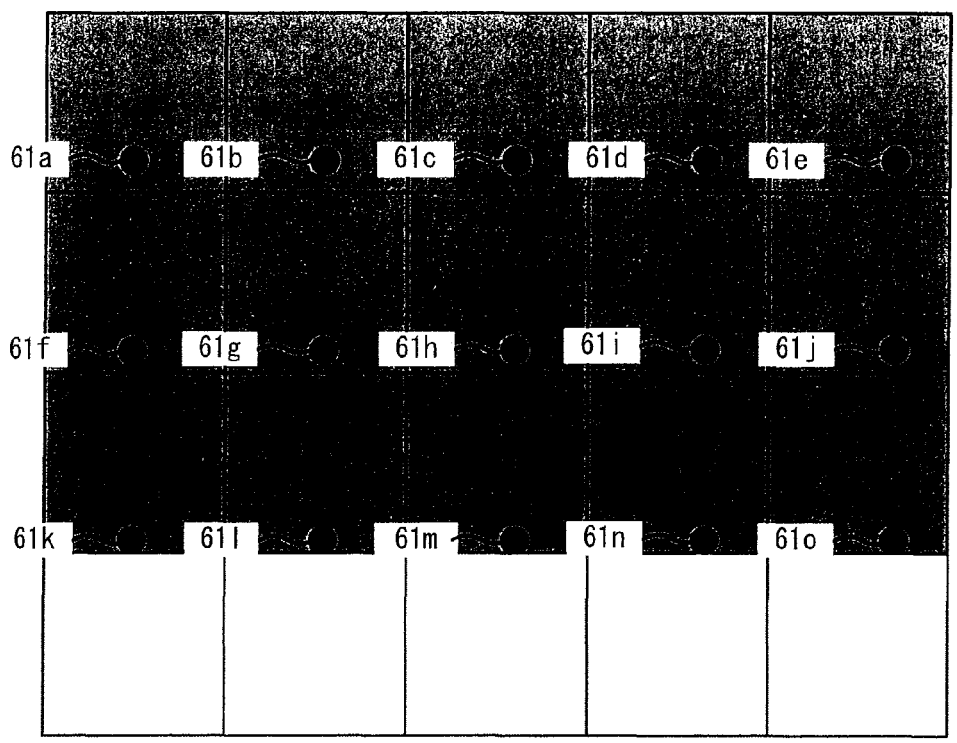

When determining the pixels corresponding to the fixed positions, the density at which referenced pixels are distributed on the display screen varies from one scaling factor that may be selected for the map on display at the display monitor 16 to another. For instance, if the map on display at the display monitor 16 has a large scaling factor, i.e., if a wide-ranging map is on display, pixels are distributed at high density, as shown in FIG. 7(a). If, on the other hand, the map on display at the display monitor 16 has a small scaling factor, i.e., if a detailed map is on display, pixels are distributed at low density, as shown in FIG. 7(b). Since the quantity of pixels in correspondence to which wind data are extracted remains unchanged at 15 if the density of pixels varies, the length of time required to execute the processing for displaying the wind data 31a through 31o over the map 30 remains substantially the same even when the scaling factor of the map displayed at the display monitor 16 is switched.

Figure 8:
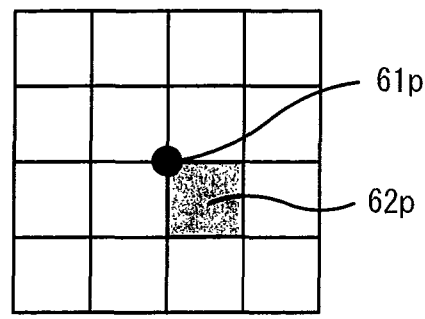
Figure 8:
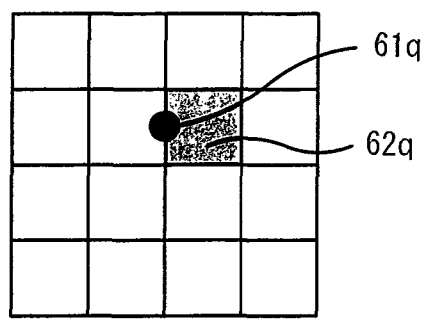
Figure 8:
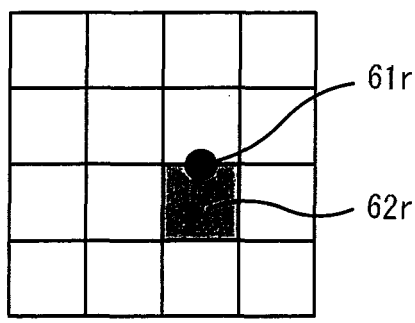

Depending upon the particulars of the map brought up on display at the display monitor 16, any of the fixed positions 61a through 61o, which correspond to the fixed positions 51a through 51o assumed at the centers of the split screen areas, may be present on a boundary of the corresponding pixel. Under such circumstances, the pixels containing the positions 61a through 61o on the map corresponding to the fixed positions 51a through 51o are determined as explained below. For instance, if a position 61p on the map corresponding to the fixed position 51a is present at the point of contact of four pixels, as indicated in FIG. 8(a), a pixel 62p taking up the lower right position (south-east position) is designated as the pixel containing the map position corresponding to the fixed position. If a position 61q on the map corresponding to the fixed position 51a is present on the boundary of two pixels adjacent to each other along the left/right (west-east) direction, as indicated in FIG. 8(b), a pixel 62q on the right side (east side) is designated as the pixel containing the map position corresponding to the fixed position. In addition, if a position 61r on the map corresponding to the fixed position 51a is present on the boundary of two pixels adjacent to each other along the top/bottom (north-south) direction, as indicated in FIG. 8(c), a pixel 62r on the bottom side (south side) is designated as the pixel containing the map position corresponding to the fixed position.

In step S504, the weather information for the pixels having been determined as described above is extracted from the weather information stored in the receiver memory 112. In step S505, the wind data indicating the wind direction, the wind velocity and the like are further extracted from the extracted weather information. In step S506, the wind data are brought up on display at the display monitor 16 as icons or numerical values indicating the wind velocities superimposed over the map. The icons are displayed at the fixed positions.

The following advantages are achieved through the embodiment of the navigation system 1 according to the present invention described above.

(1) The weather information 31a through 31o corresponding to a region containing the map area on display at the display monitor 16, is extracted from the weather information having been received via the satellite radio reception unit 111, the individual sets of information 31a through 31o having been extracted are allocated to corresponding areas of the display screen 16A and the extracted weather information 31a through 31o is displayed over the corresponding areas of the display screen 16A providing a map 30 displayed at the display monitor 16. Thus, the processing for displaying the weather information over the map can be expedited.

(2) The control circuit 11 included in the navigation system calculates geographical positions 61a through 61o corresponding to the centers 51a through 51o of the individual areas on the map 30 currently on display and also extracts the sets of weather information 31a through 31o for pixels 62a through 62o containing the geographical positions 61a through 61o having been calculated from the weather information received via the satellite radio reception unit 111. As a result, the weather information 31a through 31o to be allocated to the individual areas of the display screen 16A can be determined speedily, which ultimately speeds up the processing for displaying the weather information 31a through 31o over the map.

(3) The weather information is provided in correspondence to each of the pixels 62a through 62o defined by dividing the weather information available region into a plurality of areas, and the control circuit 11 extracts sets of weather information 31a through 31o for the split areas containing the geographical positions assumed by the individual areas of the display screen 16A among the plurality of pixels 62a through 62o. Consequently, the processing for extracting the weather information 31a through 31o to be displayed over the map 30 can be expedited.

(4) If a geographical position 61p through 61r is present on a partitioning line among lines partitioning split areas pixels 62p through 62r, the weather information for a specific split area among the plurality of pixels 62p through 62r partitioned with the partitioning lines is designated as the weather information for the particular geographical position 61p through 61r. This means that the weather information to be provided in correspondence to each area of the display screen 16A can be determined with ease, which ultimately makes it possible to expedite the processing for displaying the weather information over the map.

(5) The weather information is transmitted in correspondence to each of a plurality of tiles 20 defined by dividing the weather information available range into greater regions and each tile 20 holds sets of weather information corresponding to a plurality of mesh areas 62a through 62o defined by dividing the tile 20 into smaller areas. This system allows sets of weather information 31a through 31o to be provided in correspondence to the various areas of the display screen 16A to be determined quickly, which ultimately speeds up the processing for displaying the weather information 31a through 31o over the map.

(6) The control circuit 11 extracts weather information corresponding to mesh areas containing the geographical positions as representative weather information for a plurality of areas in the display screen 16A and thus, the sets of weather information 31a through 31o to be allocated to the areas of the display screen 16A can be determined quickly, which ultimately makes it possible to expedite the processing for displaying the weather information 31a through 31o over the map.

(7) A plurality of fixed positions 51a through 51o are set on the display screen 16A, map positions 61a through 61o corresponding to the fixed positions 51a through 51o are calculated, pixels 62a through 62o in correspondence to which wind data are to be extracted are identified based upon the map positions 61a through 61o, and the wind data 31a through 31o extracted from the pixels 62a through 62o having been identified, are brought up on display at the fixed positions 51a through 51o on the display screen. Through these measures, the wind data (wind data at specific pixels) to be superimposed over the map 30 on display, which are included in the received weather information, can be determined quickly and the processing for displaying the wind data 31a through 31o over the map 30 can be executed quickly.

(8) The fixed positions 51a through 51o remain unchanged even as the scaling factor of the map displayed on the display screen 16A is altered. Thus, even when the scaling factor of the map displayed at the display monitor 16 is switched, the wind data to be displayed over the map 30, which are included in the received weather information, can be determined speedily, ultimately making it possible to speed up the processing for displaying the wind data 31a through 31o over the map 30.

(9) The display screen 16A is split into three equal portions along the longitudinal direction and is split into five equal parts along the lateral direction so as to form 3×5 split screen areas, with the centers of the individual split screen areas designated as fixed positions 51a through 51o. Through these measures, it is ensured that the weather information over the geographical range on display at the display monitor 16 is never off-centered in the display, making it possible for the user to easily read the weather information provided over the geographical range on display at the display monitor 16A.

The embodiment described above allows for the following variations.

(1) The weather information to be superimposed over the map on display is not limited to wind direction or wind velocity. For instance, weather information may indicate temperature, humidity, precipitation par unit time, long-term precipitation, duration of sunlight par unit time, barometric pressure, humidity and the like, instead. Since such weather information can also be quickly extracted from the received weather information to be superimposed over the map on display, the processing for displaying the weather information over the map can be expedited.

(2) The number of split screen areas in correspondence to which fixed positions are set does not need to be 15 achieved by splitting the display screen into three equal parts longitudinally and five equal parts laterally, and an optimal number should be set for the quantity of split screen areas in correspondence to the size of the display screen, the resolution and the like.

Figure 9:
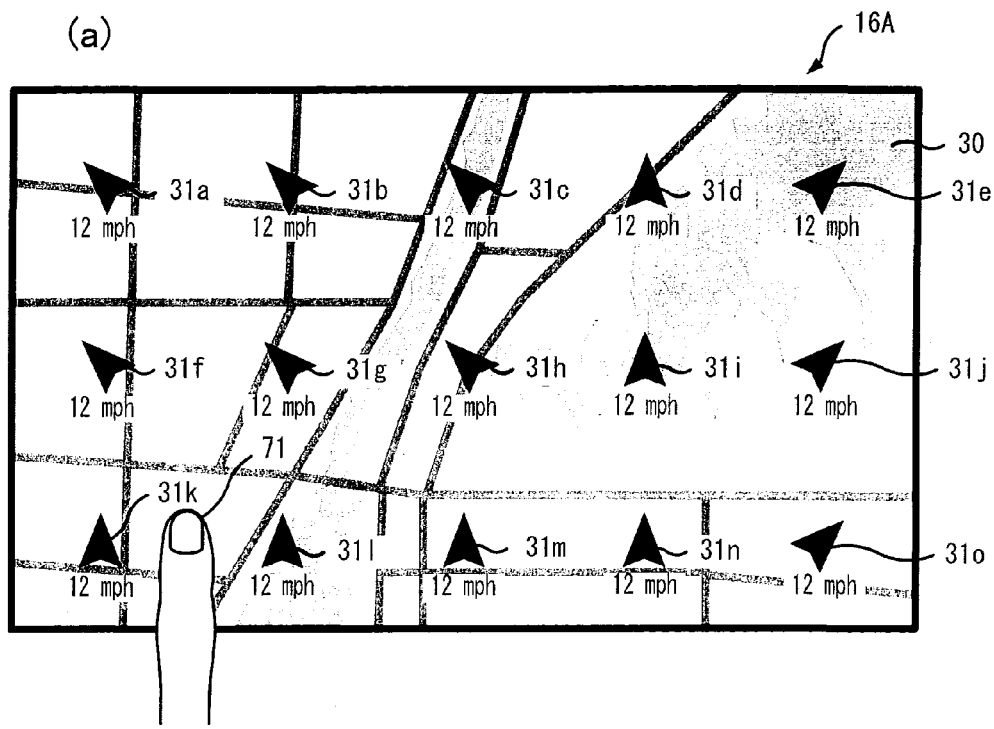
Figure 9:
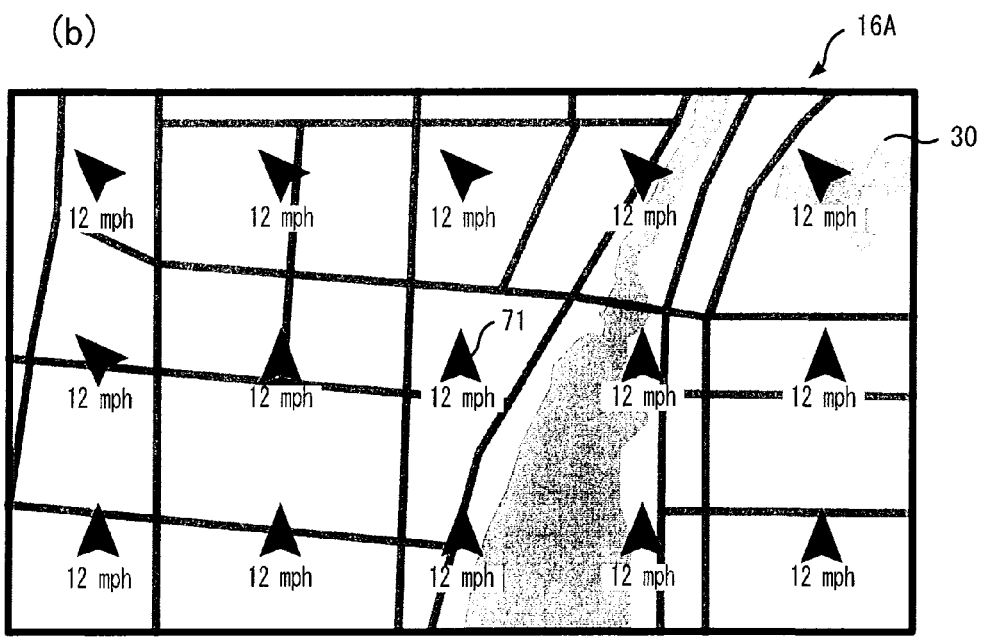

(3) A plurality of predetermined positions on the display screen, other than the fixed positions designated in the embodiment, may be set as fixed positions on the display screen. However, it is desirable that one of the plurality of fixed positions be at the center of the display screen if the map on display is scrolled to set a depressed position of the display screen at the display monitor 16 at the center of the display screen, so as to allow the user to bring up on display the wind data for a desired location at the display monitor 16 by depressing the corresponding position. For instance, the user, wishing to obtain wind data for a position 71 on the map 30, will depress the position 71, as shown in FIG. 9(a). In response, the map will be scrolled to set the depressed position 71 at the center of the display screen, as shown in FIG. 9(b). Since a fixed position 51h is set at the center of the display screen, the wind data corresponding to the position 71 will be displayed, as indicated in FIG. 9(b).

Assuming that the display screen is split into m equal parts longitudinally and n equal parts laterally to form n×m split screen areas and the centers of the individual split screen areas are designated as fixed positions, one of the fixed positions will be at the center of the display screen if m and n each represent an odd number. For this reason, it is desirable that m and n each represent an odd number if the map is scrolled to set a depressed position to the center of the display screen in response to a depression of the display screen at the display monitor 16 on which a map is displayed. However, m or n may instead represent an even number.

(4) The present invention may be adopted in a map display device other than the navigation system 1. For instance, weather information may be displayed as described above on a portable telephone having map display capability.

The embodiment described above simply represents an example and the present invention is in no way limited to the embodiment.

The invention claimed is:

1. A map display device, comprising:
a display monitor at which a display screen displaying a map is divided into a plurality of split areas and a set of weather information is displayed over each of the split areas;
a receiver that receives a set of weather information for each of a plurality of pixels within a plurality of regions, wherein each of the split areas overlaps with at least one of the pixels;
a processor; and
a memory coupled to the processor;
wherein the processor is programmed to
calculate geographical positions on the displayed map that respectively correspond to center positions of the split areas;
select, for each of the split areas that overlaps with a plurality of the pixels, one of the pixels containing the calculated geographical position of the split area;
extract, for each of the split areas that overlaps with a plurality of the pixels, the set of weather information for the selected pixel among the sets of weather information; and
display the map at the display monitor and also display the sets of the extracted weather information for the pixels superimposed on the map by allocating each of the sets of the extracted weather information for the pixels to each center position of each of the split areas on the display screen.

2. A map display device according to claim 1, wherein:
the display screen is divided into m×n (m and n each represents an odd number) split areas that are set in a two-dimensional array; and
the map display device further comprises a scroll controller programmed to scroll the map in response to a depression of the display screen at the display monitor so as to set a geographical position on the map corresponding to a depressed position to a center of the display screen.

3. A map display device according to claim 2, wherein:
once the scroll controller has finished scrolling the map, the processor calculates the geographical positions corresponding to centers of the split areas on the map currently on display and extracts the sets of weather information for the regions containing the calculated geographical positions among the sets of the received weather information.

4. A map display device according to claim 1, wherein:
the weather information indicates wind direction, wind strength, temperature, humidity, precipitation per unit time, long-term precipitation, duration of sunshine per unit time or barometric pressure or humidity.

5. A navigation system equipped with a map display device according to claim 1.

* * * * *